United States Patent
Cao et al.

(10) Patent No.: US 11,891,771 B1
(45) Date of Patent: Feb. 6, 2024

(54) DEVICES FOR PREVENTING FROST HEAVING AND THAWING SETTLEMENT

(71) Applicant: NORTHWEST INSTITUTE OF ECO-ENVIRONMENT AND RESOURCES, CAS, Gansu (CN)

(72) Inventors: Yapeng Cao, Lanzhou (CN); Guoyu Li, Lanzhou (CN); Wei Ma, Lanzhou (CN); Zhixiang Chen, Lanzhou (CN); Buxiang Wang, Lanzhou (CN); Dun Chen, Lanzhou (CN)

(73) Assignee: NORTHWEST INSTITUTE OF ECO-ENVIRONMENT AND RESOURCES, CAS, Lanzhou (CN)

( * ) Notice: Subject to any disclaimer, the term of this patent is extended or adjusted under 35 U.S.C. 154(b) by 0 days.

(21) Appl. No.: 18/458,262

(22) Filed: Aug. 30, 2023

(30) Foreign Application Priority Data

Oct. 20, 2022 (CN) .......................... 202211285154.0

(51) Int. Cl.
*E02D 31/14* (2006.01)
*E02D 27/34* (2006.01)

(52) U.S. Cl.
CPC .............. *E02D 31/14* (2013.01); *E02D 27/34* (2013.01); *E02D 2200/1685* (2013.01); *E02D 2600/40* (2013.01)

(58) Field of Classification Search
CPC ......... E02D 31/14; E02D 27/35; E02D 27/34; E02D 2600/40; E02D 2200/1685; F16L 1/026

See application file for complete search history.

(56) References Cited

U.S. PATENT DOCUMENTS

| | | | |
|---|---|---|---|
| 4,067,198 A | * | 1/1978 | Long .................... E02D 3/115 405/234 |
| 4,818,148 A | | 4/1989 | Takeda et al. |

(Continued)

FOREIGN PATENT DOCUMENTS

| | | |
|---|---|---|
| CN | 112854868 A | 5/2021 |
| CN | 112901909 A | 6/2021 |

(Continued)

OTHER PUBLICATIONS

First Office Action in Chinese Application No. 202211285154.0 dated Mar. 15, 2023, 9 pages.

(Continued)

*Primary Examiner* — Carib A Oquendo
(74) *Attorney, Agent, or Firm* — METIS IP LLC

(57) ABSTRACT

The present disclosure provides a device for preventing frost heaving and thawing settlement. The device includes a positioning cylinder, an upper cover, an anti-thawing settlement rod configured to prevent the thawing settlement, and an anti-frost heaving rod configured to prevent the frost heaving. The upper cover is sealingly assembled on a top of the positioning cylinder. A bottom of the positioning cylinder is provided with the anti-frost heaving rod. An upper portion of the positioning cylinder is provided with the anti-thawing settlement rod. The anti-frost heaving rod is provided upwards, and a bottom of the anti-frost heaving rod is rotatably provided on a mounting base of the anti-frost heaving rod through a first connecting screw rod. The anti-thawing settlement rod is provided downwards, and a top of the anti-thawing settlement rod is rotatably provided on a mounting base of the anti-thawing settlement rod through a second connecting screw rod.

10 Claims, 5 Drawing Sheets

(56) References Cited

U.S. PATENT DOCUMENTS

| | | | |
|---|---|---|---|
| 6,309,142 B1 | 10/2001 | Takeda et al. | |
| 2016/0010303 A1* | 1/2016 | Ryu | E02D 5/526 405/251 |
| 2020/0165790 A1 | 5/2020 | Wang et al. | |
| 2021/0115641 A1* | 4/2021 | Niroumand | E02D 5/523 |

FOREIGN PATENT DOCUMENTS

| | | |
|---|---|---|
| CN | 113089733 A | 7/2021 |
| CN | 114045824 A | 2/2022 |
| CN | 114263205 A | 4/2022 |

OTHER PUBLICATIONS

Decision to Grant a Patent in Chinese Application No. 202211285154.0 dated Apr. 13, 2023, 3 pages.

* cited by examiner

DEVICES FOR PREVENTING FROST HEAVING AND THAWING SETTLEMENT

CROSS-REFERENCE TO RELATED APPLICATIONS

This application claims priority to Chinese Patent Application No. 202211285154.0, filed on Oct. 20, 2022, the entire contents of which are hereby incorporated by reference.

TECHNICAL FIELD

The present disclosure relates to the technical field of frosting and thawing disaster of frozen soil, and in particular, to a device for preventing frost heaving and thawing settlement.

BACKGROUND

Soil and rocks that have been frozen for two years or more are called permafrost frozen soil. In a permafrost frozen soil region, a lower frozen portion is called a permafrost frozen soil layer, and an upper portion, which is frozen in a cold season and thaws in a warm season, is called an active layer. A plurality of buildings (structures), such as a pipeline, a transmission tower base, etc., in the permafrost frozen soil region are buried in the permafrost frozen soil layer and the active layer. When thermal erosion brought by the buildings (structures) is large, the frozen soil layer may melt. Since the frozen soil is extremely sensitive to temperature, the loss of the bearing capacity of the melted frozen soil may make the buildings (structures) undergo thawing settlement and deformation. In addition, in the cold season, the soil in the active layer of the permafrost frozen soil region under an action of a tangential frost heaving force and a normal frost heaving force may cause the buildings (structures) to be uplifted, and the phenomenon of frost heaving may occur, which may also lead to deformation of the buildings (structures). Severe frosting and thawing disasters may lead to fracture of the buildings (structures), which may seriously affect a normal service performance and service life of the buildings (structures), and cause significant economic losses and safety problems.

Due to large differences in formation lithology, ice content, climatic conditions, average annual ground temperature, and structural form of buried buildings (structures) in the frozen soil region, the thawing settlement or frost heaving of the buildings (structures) is usually difficult to be predicted before the buildings (structures) are constructed. Therefore, it is desirable to provide a device for preventing frost heaving and thawing settlement to solve problems of frost heaving and thawing settlement.

SUMMARY

One or more embodiments of the present disclosure provide a device for preventing frost heaving and thawing settlement. The device may include a positioning cylinder, an upper cover, an anti-thawing settlement rod configured to prevent the thawing settlement, and an anti-frost heaving rod configured to prevent the frost heaving. The upper cover may be sealingly assembled on a top of the positioning cylinder, and the upper cover may be provided with a fixing position configured to install a structure. A bottom of the positioning cylinder may be provided with the anti-frost heaving rod, and an upper portion of the positioning cylinder may be provided with the anti-thawing settlement rod. The anti-frost heaving rod may be provided upwards, and a bottom of the anti-frost heaving rod may be rotatably provided on a mounting base of the anti-frost heaving rod through a first connecting screw rod. The anti-thawing settlement rod may be provided downwards, and a top of the anti-thawing settlement rod may be rotatably provided on a mounting base of the anti-thawing settlement rod through a second connecting screw rod. The first connecting screw rod and the second connecting screw rod may be provided with a return spring, respectively. The anti-thawing settlement rod may be connected to a lower portion of the positioning cylinder through a trigger mechanism. The trigger mechanism may include a rotating hook and a trigger rod. The rotating hook may be matched with a positioning hook arranged at an end of the anti-thawing settlement rod to position the anti-thawing settlement rod. A bottom of the trigger rod may penetrate out of the bottom of the positioning cylinder. The trigger rod may be in contact with the rotating hook to drive the rotating hook to rotate when the trigger rod moves upwards, and the positioning hook may be separated from the rotating hook when the trigger rod is rotated.

In some embodiments, the upper cover may be connected to the top of the positioning cylinder through threads.

In some embodiments, a positioning bracket may be fixed on a side wall of the positioning cylinder, and a middle of the rotating hook may be rotationally connected to the positioning bracket.

In some embodiments, an end of the rotating hook may be provided with a hook matching the positioning hook, a tension spring may be fixed at the end of the rotating hook, and another end of the tension spring may be fixed to the positioning bracket.

In some embodiments, a limiting mechanism may be provided on a side wall of the positioning cylinder to limit a position of the trigger rod. The limiting mechanism may include a vertically and fixedly provided limiting block. One or more pre-tightening members in a horizontal arrangement may be provided in the limiting block. Each of the one or more pre-tightening members may include a compression spring and a positioning ball fixed at an end of the compression spring. The trigger rod may be provided with a positioning groove matching the positioning ball.

In some embodiments, a plurality of anti-thawing settlement rods may be provided uniformly and circumferentially on an outer wall of the positioning cylinder, and a plurality of anti-frost heaving rods may be provided uniformly and circumferentially on the outer wall of the positioning cylinder.

In some embodiments, the plurality of anti-thawing settlement rods and the plurality of anti-frost heaving rods may be provided in an upper and lower interval arrangement.

In some embodiments, a first limiting baffle may be fixed to a side surface of the mounting base of the anti-frost heaving rod to limit a rotating angle of the anti-frost heaving rod when the anti-frost heaving rod is spread out; and a second limiting baffle may be fixed to a side surface of the mounting base of the anti-thawing settlement rod to limit a rotating angle of the anti-thawing settlement rod when the anti-thawing settlement rod is spread out.

In some embodiments, a first side baffle may be fixed to a left side surface of the anti-frost heaving rod or the anti-thawing settlement rod, and a second side baffle may be fixed to a right side surface of the anti-frost heaving rod or the anti-thawing settlement rod.

In some embodiments, a top of the anti-frost heaving rod may be an inclined plane. The top of the anti-thawing settlement rod may be an inclined plane. A first angle between a top surface and an inner side surface of the anti-frost heaving rod may be an obtuse angle. A second angle between a top surface and an inner side surface of the anti-thawing settlement rod may be an obtuse angle. A third angle between the top surface and an outer side surface of the anti-frost heaving rod may be an acute angle. A fourth angle between the top surface and an outer side surface of the anti-thawing settlement rod may be an acute angle.

BRIEF DESCRIPTION OF THE DRAWINGS

The present disclosure is further illustrated in terms of exemplary embodiments. These exemplary embodiments are described in detail according to the drawings. These embodiments are non-limiting exemplary embodiments, in which like reference numerals represent similar structures, wherein.

Figure 1:
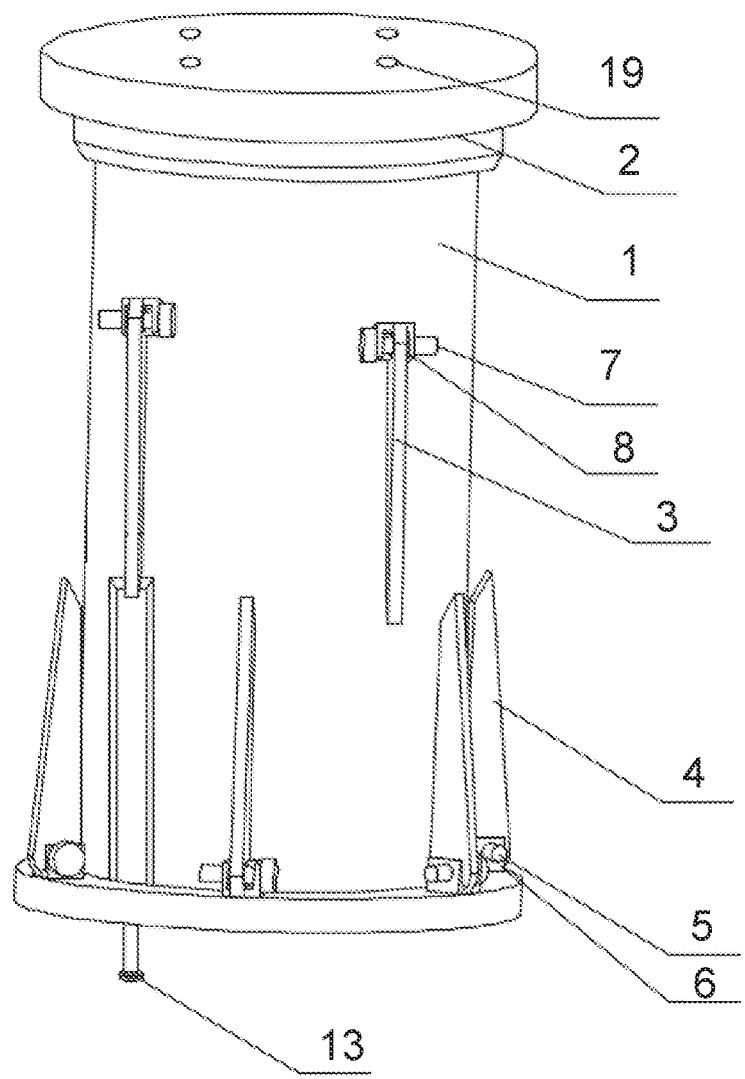
FIG. 1 is a schematic diagram illustrating a structure of a device for preventing frost heaving and thawing settlement according to some embodiments of the present disclosure.

In the drawings: 1. positioning cylinder, 2. upper cover, 3. anti-thawing settlement rod, 3-1. positioning hook, 4. anti-frost heaving rod, 5. first connecting screw rod, 6. mounting base of an anti-frost heaving rod, 7. second connecting screw rod, 8. mounting base of an anti-thawing settlement rod, 9. return spring, 10. limiting baffle, 11. side baffle, 12., rotating hook, 13. trigger rod, 14. positioning bracket, 15. limiting block, 16. compression spring, 17. positioning ball, 18. positioning groove, 19. fixing position, 20. tension spring.

DETAILED DESCRIPTION

To more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that "system", "device", "unit" and/or "module" as used herein is a manner used to distinguish different components, elements, parts, sections, or assemblies at different levels. However, if other words serve the same purpose, the words may be replaced by other expressions.

As shown in the present disclosure and claims, the words "one", "a", "a kind" and/or "the" are not especially singular but may include the plural unless the context expressly suggests otherwise. In general, the terms "comprise," "comprises," "comprising," "include," "includes," and/or "including," merely prompt to include operations and elements that have been clearly identified, and these operations and elements do not constitute an exclusive listing. The methods or devices may also include other operations or elements.

FIG. 1 is a schematic diagram illustrating a structure of a device for preventing frost heaving and thawing settlement according to some embodiments of the present disclosure.

As shown in FIG. 1, the present disclosure provides a device for preventing frost heaving and thawing settlement. The device may include a positioning cylinder 1, an upper cover 2, an anti-thawing settlement rod 3 configured to prevent the thawing settlement, and an anti-frost heaving rod 4 configured to prevent the frost heaving. The upper cover 2 may be sealingly assembled on a top of the positioning cylinder 1, and the upper cover 2 may be provided with a fixing position 19. A bottom of the positioning cylinder 1 may be provided with the anti-frost heaving rod 4, and an upper portion of the positioning cylinder 1 may be provided with the anti-thawing settlement rod 3. The anti-frost heaving rod 4 may be provided upwards, and the anti-thawing settlement rod 3 may be provided downwards. The anti-thawing settlement rod 3 may be connected to a lower portion of the positioning cylinder 1 through a trigger mechanism. The trigger mechanism may include a rotating hook and a trigger rod 13. The rotating hook may be matched with a positioning hook provided at an end of the anti-thawing settlement rod 3 to position the anti-thawing settlement rod 3. The trigger rod 13 may be in contact with the rotating hook to drive the rotating hook to rotate when the trigger rod moves upwards, and the positioning hook may be separated from the rotating hook when the trigger rod is rotated.

The upper cover 2 refers to a structure for sealing the positioning cylinder 1. A cross-sectional shape of the upper cover 2 may include a circle, a square, other regular or irregular shapes, or the like.

In some embodiments, the upper cover 2 may be sealingly assembled on the top of the positioning cylinder 1 in various manners. For example, the sealingly assembled manner may include welding, snap connection, etc.

In some embodiments, the upper cover 2 may be provided on the top of the positioning cylinder 1 through a threaded connection to achieve sealing for the positioning cylinder 1.

A structure refers to an object that may be supported by the device for preventing frost heaving and thawing settlement. For example, the structure may include a pipeline, a transmission tower base, a ground temperature monitoring hole, a transmission tower pole, etc.

In some embodiments, the upper cover 2 may be provided with the fixing position 19. The fixing position 19 may be a point position used to connect and fix another component. In some embodiments, the fixing position 19 may be configured to install the structure.

In some embodiments, a count of the fixation position 19 may be determined based on actual needs. For example, the count of the fixing position 19 may be determined based on an installation manner of the structure. It should be understood that when a plurality of fixing positions 19 are provided, the plurality of fixing positions 19 may be evenly provided on the upper cover 2 to achieve stable support of the structure by the device for preventing frost heaving and thawing settlement.

The positioning cylinder 1 refers to a cylinder body structure of the device for preventing frost heaving and thawing settlement. In some embodiments, an overall structural shape of the positioning cylinder 1 may be in a shape of circle. In some embodiments, the overall structural shape of the positioning cylinder 1 may also be another shape, such as a square, an ellipse, other regular or irregular shapes, or the like.

In some embodiments, a structural dimension (e.g., a diameter) of the positioning cylinder 1 may be determined based on actual needs. For example, the structural dimension of the positioning cylinder 1 may be determined based on a dimension of the structure, etc.

In some embodiments, the bottom of the positioning cylinder 1 may be provided with the anti-frost heaving rod 4, and the upper portion of the positioning cylinder 1 may be provided with the anti-thawing settlement rod 3.

The anti-frost heaving rod 4 refers to a rod configured to solve a problem of frost heaving. In some embodiments, the anti-frost heaving rod 4 may be provided upwards, and a bottom of the anti-frost heaving rod 4 may be rotatably provided on a mounting base of the anti-frost heaving rod 6 through a first connecting screw rod 5.

The mounting base of the anti-frost heaving rod 6 refers to a base configured to install the anti-frost heaving rod 4. In some embodiments, the mounting base of the anti-frost heaving rod 6 may be provided on the bottom of the positioning cylinder 1 and may be in a fixed connection with the positioning cylinder 1. The fixed connection may include a detachable connection (e.g., a threaded connection, etc.) and an undetachable connection (e.g., a welding connection, etc.).

In some embodiments, the mounting base of the anti-frost heaving rod 6 may also be provided on the bottom of the positioning cylinder 1 in another manner. For example, the mounting base of the anti-frost heaving rod 6 and the positioning cylinder 1 may be configured as a one-piece molded structure.

The first connecting screw rod 5 refers to a rod configured to connect the anti-frost heaving rod 4 to the mounting base of the anti-frost heaving rod 6.

In some embodiments, the bottom of the anti-frost heaving rod 4 may be rotatably provided on the mounting base of the anti-frost heaving rod 6 through the first connecting screw rod 5. It should be understood that the bottom of the anti-frost heaving rod 4 may be rotated at a certain angle around a circumferential direction of the first connecting screw rod 5.

In some embodiments, the anti-frost heaving rod 4 may also be rotatably provided on the mounting base of the anti-frost heaving rod 6 based on another structure (e.g., a gear structure, etc.).

It should be noted that the anti-frost heaving rod 4 may be provided in correspondence with the mounting base of the anti-frost heaving rod 6. A count and a structural dimension of the anti-frost heaving rod 4, and a count and a structural dimension of the mounting base of the anti-frost heaving rod 6 may be determined based on the structural dimension of the positioning cylinder 1. For example, when a diameter of the positioning cylinder 1 increases, the count of the anti-frost heaving rod 4 and the count of the mounting base of the anti-frost heaving rod 6 may be correspondingly increased, and the structural dimension of the anti-frost heaving rod 4 and the structural dimension of the mounting base of the anti-frost heaving rod 6 may also be correspondingly increased.

Figure 4:
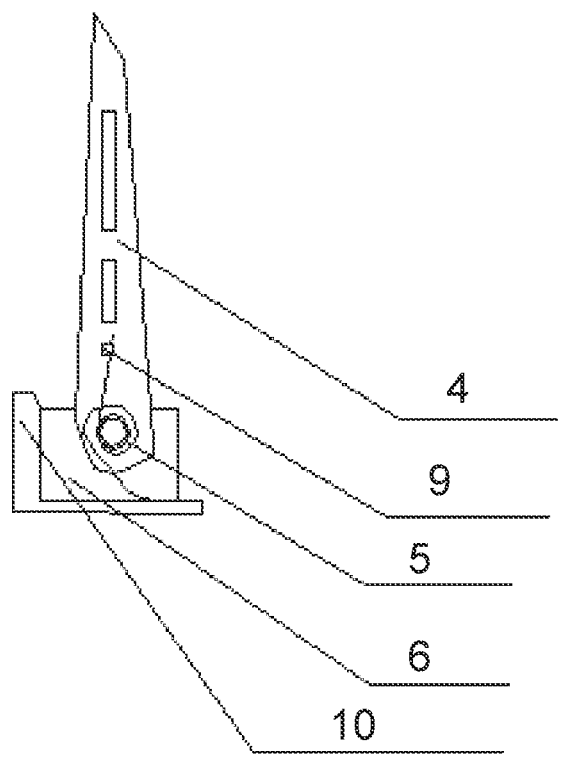
FIG. 4 is a schematic diagram illustrating a connection structure of an anti-frost heaving rod and a mounting base of the anti-frost heaving rod according to some embodiments of the present disclosure.
Figure 5:
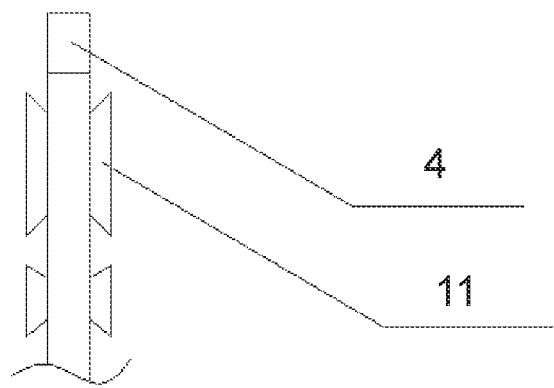
FIG. 5 is a schematic diagram illustrating a connection structure of an anti-frost heaving rod and a side baffle according to some embodiments of the present disclosure.

More descriptions regarding the anti-frost heaving rod and the mounting base of the anti-frost heaving rod may be found elsewhere in the present disclosure (e.g., FIGS. 4-5 and related descriptions thereof).

The anti-thawing settlement rod 3 refers a rod configured to solve a problem of thawing settlement. In some embodiments, the anti-thawing settlement rod 3 may be provided downwards, and a top of the anti-thawing settlement rod 3 may be rotatably provided on a mounting base 8 of the anti-thawing settlement rod 3 through a second connecting screw rod 7.

The mounting base 8 of the anti-thawing settlement rod 3 refers to a base configured to install the anti-thawing settlement rod 3. In some embodiments, the mounting base 8 of the anti-thawing settlement rod 3 may be provided on the top of the positioning cylinder 1 and may be in the fixed connection with the positioning cylinder 1.

In some embodiments, the mounting base 8 of the anti-thawing settlement rod 3 may also be provided on the top of the positioning cylinder 1 in another manner. For example, the mounting base 6 of the anti-frost heaving rod 4 and the positioning cylinder 1 may be configured as a one-piece molded structure.

The second connecting screw rod 7 refers to a rod configured to connect the anti-thawing settlement rod 3 to the mounting base 8 of the anti-thawing settlement rod 3.

In some embodiments, the bottom of the anti-thawing settlement rod 3 may be rotatably provided on the mounting base 8 of the anti-thawing settlement rod 3 through the second connecting screw rod 7. It should be understood that the bottom of the anti-thawing settlement rod 3 may be rotated at a certain angle around a circumferential direction of the second connecting screw rod 7.

In some embodiments, the anti-thawing settlement rod 3 may also be rotatably provided on the mounting base 8 of the anti-thawing settlement rod 3 based on another structure (e.g., the gear structure, etc.).

It should be noted that the anti-thawing settlement rod 3 may be provided in correspondence with the mounting base 8 of the anti-thawing settlement rod 3. A count and a structural dimension of the anti-thawing settlement rod 3, and a count and a structural dimension of the mounting base 8 of the anti-thawing settlement rod 3 may be determined based on the structural dimension of the positioning cylinder 1. For example, when the diameter of the positioning cylinder 1 increases, the count of the anti-thawing settlement rod 3 and the count of the mounting base 8 of the anti-thawing settlement rod 3 may be correspondingly increased, and the structural dimension of the anti-thawing settlement rod 3 and the structural dimension of the mounting base 8 of the anti-thawing settlement rod 3 may also be correspondingly increased.

As shown in FIG. 1 and FIG. 4, the first connecting screw rod 5 and the second connecting screw rod 7 may be provided with a return spring 9, respectively.

The return spring 9 refers to a spring structure configured to confine the anti-thawing settlement rod 3 and the anti-frost heaving rod 4. As shown in FIG. 4, an end of the return spring 9 may be connected to the first connecting screw rod 5, and another end of the return spring 9 may be connected to the anti-frost heaving rod 4.

In some embodiments, under the action of the return spring 9, the anti-thawing settlement rod 3 and the anti-frost heaving rod 4 may be in a half-spread state, so that the device for preventing frost heaving and thawing settlement may realize functions of preventing frost heaving and thawing settlement.

Figure 2:
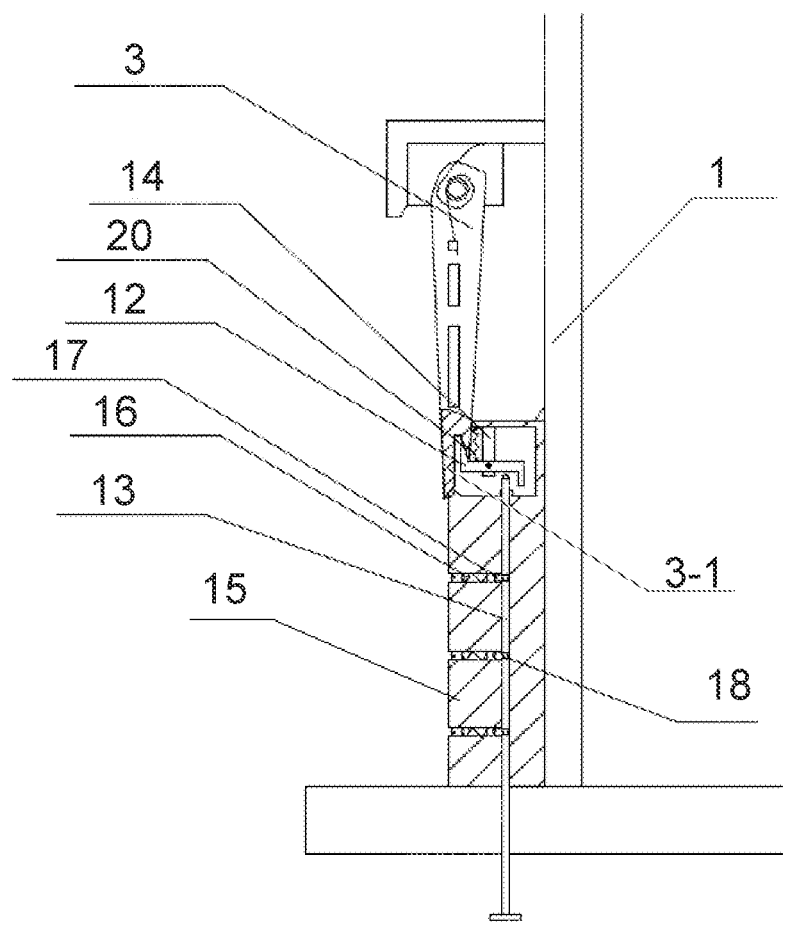
FIG. 2 is a schematic diagram illustrating structures of a positioning bracket, a rotating hook, and a trigger rod according to some embodiments of the present disclosure.

As shown in FIG. 1 and FIG. 2, the anti-thawing settlement rod 3 may be connected to the lower portion of the positioning cylinder 1 through the trigger mechanism. The trigger mechanism may include the rotating hook 12 and the trigger rod 13. The rotating hook 12 may be matched with the positioning hook 3-1 provided at the end of the anti-thawing settlement rod 3 to position the anti-thawing settlement rod 3. A bottom of the trigger rod 13 may penetrate out of the bottom of the positioning cylinder 1. The trigger rod 13 may be in contact with the rotating hook 12 to drive the rotating hook 12 to rotate when the trigger rod 13 moves upwards, and the positioning hook 3-1 may be separated from the rotating hook 12 when the trigger rod 13 is rotated.

The trigger mechanism refers to a mechanism configured to trigger the anti-thawing settlement rod 3 to be spread out.

The trigger rod 13 refers to a rod configured to trigger the rotating hook 12 to rotate and the anti-thawing settlement rod 3 to be spread out. In some embodiments, a cross-sectional shape of the trigger rod 13 may include but is not limited to a circle, an ellipse, a square, a rectangle, etc.

In some embodiments, a dimension (e.g., a length) of the trigger rod 13 may be determined based on actual needs. For example, the dimension of the trigger rod 13 may be determined based on a dimension (e.g., a height) of the positioning cylinder 1.

The rotating hook 12 refers to a structure that cooperates with the positioning hook 3-1 to fix the anti-thawing settlement rod 3.

In some embodiments, the rotating hook 12 may cooperate with the positioning hook 3-1 to fix the anti-thawing settlement rod 3, thereby avoiding inconvenience during installation by preventing the anti-thawing settlement rod 3 from being in a half-spread state or a spread-out state when the device for preventing frost heaving and thawing settlement is installed.

It should be noted that structures of the rotating hook 12 and the positioning hook 3-1 may not be limited, and the rotating hook 12 and the positioning hook 3-1 may be matched with each other to realize fixation of the anti-thawing settlement rod 3.

In some embodiments of the present disclosure, by providing the trigger mechanism, the device for preventing frost heaving and thawing settlement may be easier to be installed and applicable to different installation scenarios. For example, for ease of backfilling and installation, an installation hole of the ground temperature monitoring hole is generally small. When the device for preventing frost heaving and thawing settlement is placed into the installation hole, if the anti-thawing settlement rod is in the half-spread state or the spread-out state, installation may be inconvenient, which may affect the installation efficiency. However, by setting the trigger mechanism, the anti-thawing settlement rod may be in a close-state in an installation process, thus improving the installation efficiency.

Figure 3:
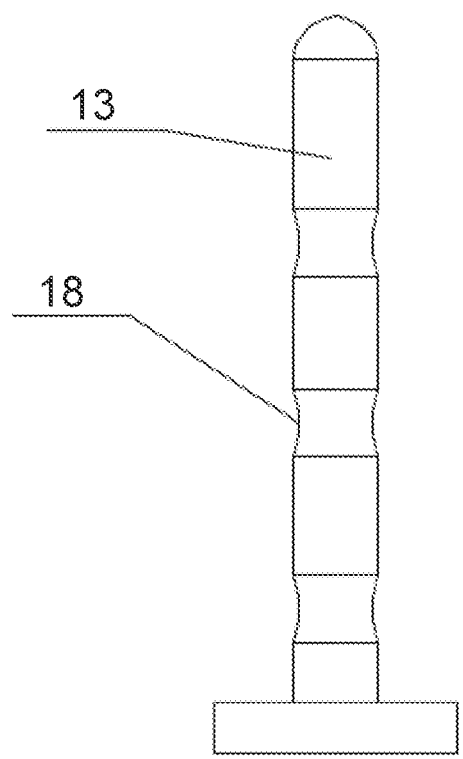
FIG. 3 is a schematic diagram illustrating a structure of a trigger rod according to some embodiments of the present disclosure.

More descriptions regarding the positioning cylinder and the trigger mechanism may be found in FIGS. 2-3 and related descriptions thereof.

In some embodiments, a plurality of anti-thawing settlement rods 3 and a plurality of anti-frost heaving rods 4 may be provided. The plurality of anti-thawing settlement rods 3 and the plurality of anti-frost heaving rods 4 may be provided in various ways. For example, if the count of the anti-thawing settlement rods 3 is 4, and the count of the anti-frost heaving rods 4 is 4, the four anti-thawing settlement rods 3 may be divided into two groups (i.e., each group includes 2 anti-thawing settlement rods 3) and symmetrically provided on a left side and a right side of the top of the positioning cylinder 1. The four anti-frost heaving rods 4 may also be divided into two groups (i.e., each group includes 2 anti-frost heaving rods 4) and symmetrically provided on a front side and a rear side of the bottom of the positioning cylinder 1.

As shown in FIG. 1, the plurality of anti-thawing settlement rods 3 may be uniformly and circumferentially provided on an outer wall of the positioning cylinder 1, and the plurality of anti-frost heaving rods 4 may also be uniformly and circumferentially provided on the outer wall of the positioning cylinder 1. A uniformly and circumferentially arrangement also refers to a circumferential arrangement with equal intervals.

In some embodiments, the anti-thawing settlement rods 3 and the anti-frost heaving rods 4 may be provided in an upper and lower interval arrangement. As shown in FIG. 1, the plurality of anti-thawing settlement rods 3 and the plurality of anti-frost heaving rods 4 may be uniformly and circumferentially provided on the outer wall of the positioning cylinder 1, and the plurality of anti-thawing settlement rods 3 and the plurality of anti-frost heaving rods 4 may also be provided in the upper and lower interval arrangement.

In some embodiments of the present disclosure, the plurality of anti-thawing settlement rods and the plurality of anti-frost heaving rods may be provided at intervals, so that the structure may not be tilted or overturned due to uneven frost heaving or thawing settlement in a process of frost heaving and thawing settlement. Thus, stability of the device for preventing frost heaving and thawing settlement may be effectively improved.

In some embodiments, a method for using the device for preventing frost heaving and thawing settlement may include the following operations.

S1: an installation hole may be formed by drilling a hole in frozen soil.

S2: the device for preventing frost heaving and thawing settlement may be arranged in the installation hole. When the device is arranged in the installation hole, the anti-thawing settlement rod 3 may be fixed to the rotating hook 12 through the positioning hook 3-1 at the end of the anti-thawing settlement rod 3 to fit the positioning cylinder 1. The plurality of anti-frost heaving rods 4 may be in the half-spread state, and spread-out angles of the anti-frost heaving rods 4 may change with a diameter of the installation hole. When the installation hole is relatively large, the spread-out angles of the anti-frost heaving rods 4 are large; when the installation hole is relatively small, the spread-out angles of the anti-frost heaving rods 4 may be small due to the limitation of an inner wall of the installation hole, which is suitable for different assembly scenarios.

S3: when the bottom of the trigger rod 13 contacts a bottommost portion of the installation hole, the top of the trigger rod 13 may be in contact with an end of the rotating hook 12, causing the end of the rotating hook 12 to move upwards and the rotating hook 12 to rotate, and then another end of the rotating hook 12 may move downwards, and the positioning hook 3-1 may be separated from the rotating hook 12. Under the action of the return spring 9, the anti-thawing settlement rods 3 may be in the half-spread state. That is, when the device for preventing frost heaving and thawing settlement is arranged in place, the anti-frost heaving rods 4 and the anti-thawing settlement rods 3 may be in the half-spread state.

S4: the structure may be arranged on the device for preventing frost heaving and thawing settlement and the installation hole may be backfilled.

Merely by way of example, when the structure supported by the up portion of the device for preventing frost heaving and thawing settlement is a pipeline, it may be preferred to excavate a pipe trench in the frozen soil, and then, in a same manner as described above, the device for preventing frost heaving and thawing settlement may be arranged in the pipe trench, the structure may be arranged on the device for preventing frost heaving and thawing settlement, and the pipe trench may be backfilled.

It should be understood that when the thawing settlement occurs, since the anti-thawing settlement rod 3 has a certain spread-out angle, the larger the thawing settlement displacement, the larger the spread-out angle of the anti-thawing settlement rod 3, thereby achieving the purpose of preventing the thawing settlement. When the frost heaving occurs, since the anti-frost heaving rod 4 also has a certain spread-out angle, the larger the frost heaving displacement, the larger the spread-out angle of the anti-frost heaving rod 4, thereby achieving the purpose of preventing the frost heaving. Accordingly, the device for preventing frost heaving and thawing settlement may not only inhibit the frost heaving but also weaken the thawing settlement.

FIG. 2 is a schematic diagram illustrating structures of a positioning bracket, a rotating hook, and a trigger rod according to some embodiments of the present disclosure. FIG. 3 is a schematic diagram illustrating a structure of a trigger rod according to some embodiments of the present disclosure.

As shown in FIG. 2, a positioning bracket 14 may be fixed to a side wall of the positioning cylinder 1, and a middle of the rotating hook 12 may be rotationally connected to the positioning bracket 14.

The positioning bracket 14 refers to a structure configured to fix the rotating hook 12.

In some embodiments, the positioning bracket 14 may be fixed directly or indirectly to the side wall of the positioning cylinder 1. For example, the positioning bracket 14 may be in a fixed connection with another structure and fixed to the side wall of the positioning cylinder 1 through the another structure to achieve indirect fixation of the positioning bracket 14 to the side wall of the positioning cylinder 1.

In some embodiments, the middle of the rotating hook 12 may be rotationally connected to the positioning bracket 14 in various ways. For example, the middle of the rotating hook 12 may be rotationally connected to the positioning bracket 14 through hinge joint. As another example, the middle of the rotating hook 12 may be rotatably connected to the positioning bracket 14 in an arrangement manner of penetrating through the positioning bracket 14.

In some embodiments of the present disclosure, the middle of the rotating hook 12 may be rotationally connected to the positioning bracket 14, and matching and separating of the rotating hook and the positioning hook may be realized under the action of the trigger rod, which is simple in structure and low in process difficulty.

In some embodiments, an end of the rotating hook 12 may be provided with a hook matching the positioning hook 3-1, and a tension spring 20 may be fixed at the end of the rotating hook 12. Another end of the tension spring 20 may be fixed to the positioning bracket 14. The tension spring 20 may provide sufficient tension force to ensure that the positioning hook 3-1 and the rotating hook 12 may be effectively connected.

In some embodiments, the another end of the rotating hook 12 may be driven by the trigger rod 13. When the trigger rod 13 moves upwards, the trigger rod 13 may be in contact with the another end of the rotating hook 12 to jack the rotating hook 12 to be rised, and the positioning hook 3-1 may be separated from the hook at the end of the rotating hook 12 when the end of the rotating hook 12 moves downwards, thereby releasing limitation and fixation.

As shown in FIGS. 2-3, a limiting mechanism may be provided on to side wall of the positioning cylinder 1 to limit a position of the trigger rod 13. The limiting mechanism may include a vertically and fixedly provided limiting block. One or more pre-tightening members in a horizontal arrangement may be provided in the limiting block 15. Each of the one or more pre-tightening members may include a compression spring 16 and a positioning ball 17 fixed at an end of the compression spring 16. The trigger rod 13 may be provided with a positioning groove 18 matching the positioning ball 17.

The limiting mechanism refers to a mechanism configured to limit the position of the trigger rod 13.

The limiting block 15 refers to a block structure configured to limit the position of trigger rod 13. In some embodiments, the limiting block 15 may be an integral structure or may be a combination of a plurality of structures. For example, the limiting block 15 may be formed by a plurality of identical block structures through splicing.

The pre-tightening member may be configured to pre-tighten the trigger rod 13 to limit the position of the trigger rod 13. In some embodiments, the pre-tightening member may include the compression spring 16 and the positioning ball 17 fixed at the end of the compression spring 16. The compression spring 16 may provide a compression force to bring the positioning ball 17 into contact with the trigger rod 13.

In some embodiments, dimensions of the compression spring 16 and the positioning ball 17 may be determined based on a dimension of the trigger rod 13. For example, when the dimension of the trigger rod 13 is relatively large, the dimensions of the compression spring 16 and the positioning ball 17 may be correspondingly increased.

The positioning groove 18 refers to a groove provided on the trigger rod 13 and configured to cooperate with the positioning ball 17. In some embodiments, the positioning groove 18 may be an annular groove, as shown in FIG. 3. In some embodiments, the positioning groove 18 may also be another groove structure, such as a semi-annular groove, a partial groove, etc.

It should be noted that the positioning groove 18 may be provided in correspondence with the pre-tightening member, and a dimension of the positioning groove 18 may be adapted to the dimension of the positioning ball 17.

In some embodiments, the limiting mechanism may also be designed as another structure. For example, the limiting mechanism may include a slide rail structure, etc.

In some embodiments, in a natural state, the compression spring 16 may exert a pressure on the trigger rod 13 through the positioning ball 17 to prevent the trigger rod 13 from falling under the force of gravity. When the device for preventing frost heaving and thawing settlement is arranged in the bottommost portion of the installation hole, the trigger rod 13 may contact a bottom of the installation hole, and the trigger rod 13 may move upwards, thereby applying a pressure to the positioning ball 17 in a reverse direction, and causing the compression spring 16 to be contracted.

In some embodiments of the present disclosure, by arranging the limiting mechanism to limit the position of the trigger rod, not only the trigger rod may be prevented from falling under the force of gravity, but also the trigger rod may move upwards when the trigger rod contact the bottommost portion of the installation hole.

FIG. 4 is a schematic diagram illustrating a connection structure of an anti-frost heaving rod and a mounting base of the anti-frost heaving rod according to some embodiments of the present disclosure. FIG. 5 is a schematic diagram illustrating a connection structure of an anti-frost heaving rod and a side baffle according to some embodiments of the present disclosure.

As shown in FIG. 4, a first limiting baffle 10 may be fixed to a side surface of the mounting base 6 of the anti-frost heaving rod 4 to limit a rotating angle of the anti-frost heaving rod 4 when the anti-frost heaving rod 4 is spread out. A second limiting baffle 10 may be fixed to a side surface of the mounting base 8 of the anti-thawing settlement rod 3 to limit a rotating angle of the anti-thawing settlement rod 3 when the anti-thawing settlement rod 3 is spread out.

The limiting baffles 10 refer to structures configured to limit the rotating angles of the anti-thawing settlement rod 3 and the anti-frost heaving rod 4 when the anti-thawing settlement rod 3 and the anti-frost heaving rod 4 are spread out. In some embodiments, the first limiting baffle 10 may be provided between the mounting base 6 of the anti-frost heaving rod 4 and the outer wall of the positioning cylinder 1, and the second limiting baffle 10 may be provided between the mounting base 8 of the anti-thawing settlement rod 3 and the outer wall of the positioning cylinder 1. When the anti-frost heaving rod 4 or the anti-thawing settlement rod 3 are spread out, the anti-frost heaving rod 4 or the anti-thawing settlement rod 3 may slowly rotate until a bottom of the anti-frost heaving rod 4 or a bottom of the anti-thawing settlement rod 3 contacts with the first limiting baffle 10 or the second limiting baffle 10, and then the anti-frost heaving rod 4 or the anti-thawing settlement rod 3 may stop rotating, thereby preventing the anti-frost heaving rod 4 or the anti-thawing settlement rod 3 from spreading out too large and losing a prevention and control function.

As shown in FIG. 1 and FIG. 5, side baffles 11 may be fixed to a left side surface and a right side surface of the anti-frost heaving rod 4, respectively. In some embodiments, side baffles 11 may be fixed to a left side surface and a right side surface of the anti-thawing settlement rod 3, respectively.

In some embodiments of the present disclosure, a contact area of the anti-frost heaving rod or the anti-thawing settlement rod with the frozen soil may be increased by providing the side baffles to optimize the effect of preventing frost heaving and thawing settlement.

In some embodiments, a top of the anti-frost heaving rod 4 may be an inclined plane, and the top of the anti-thawing settlement rod 3 may be an inclined plane. A first angle between a top surface and an inner side surface of the anti-frost heaving rod 4 may be an obtuse angle, and a second angle between a top surface and an inner side surface of the anti-thawing settlement rod 3 may be an obtuse angle. A third angle between the top surface and an outer side surface of the anti-frost heaving rod 4 may be an acute angle, and a fourth angle between the top surface and an outer side surface of the anti-thawing settlement rod 3 may be an acute angle. Therefore, the contact area between the anti-frost heaving rod 4 or the anti-thawing settlement rod 3 with the frozen soil may be increased to optimize the effect of preventing frost heaving and thawing settlement.

In some embodiments, the device for preventing frost heaving and thawing settlement may further include a reinforcing structure (not shown in the figures). The reinforcing structure may include a mesh rod, a short rod, a positioning ring, or a spring.

The reinforcing structure refers to a structure configured to enhance the effect of the device for preventing frost heaving and thawing settlement.

In some embodiments, the reinforcing structure may be provided in a middle of the positioning cylinder 1, and the reinforcing structure, the anti-thawing settlement rod 3, and the anti-frost heaving rod 4 may be arranged in an upper and lower interval arrangement. In some embodiments, the reinforcing structure may also be provided in any other feasible position. For example, the reinforcing structure may be provided on the upper portion or the lower portion of the positioning cylinder 1.

The mesh rod refers to a rod with a mesh structure at an end of the rod. In some embodiments, the end of the mesh rod may be provided with the mesh structure, and another end of the mesh rod may be rotationally connected (e.g., the hinge joint) with the outer wall of the positioning cylinder 1 to achieve a rotation at a certain rotating angle.

In some embodiments, the end of the mesh rod may be in a detachable connection with the outer wall of the positioning cylinder 1 to facilitate the installation of the mesh rod and the adjustment of a count of the mesh rod as needed.

It should be understood that the count and the structural dimension of the mesh rod may be determined based on actual needs. For example, the count of the mesh rod may be determined based on a dimension of the positioning cylinder 1.

The short rod refers to a structure configured to connect the mesh rod to the positioning ring. In some embodiments, an end of the short rod may be rotationally connected to the mesh rod, and another end of the short rod may be rotationally connected to the positioning ring.

The positioning ring refers to an annular structure configured to be slidably connected with the positioning cylinder 1. In some embodiments, the positioning ring may be a whole ring or a ring formed by a combination of a plurality of curved components. For example, the positioning ring may be formed by a combination of two half-rings to facilitate installation and disassembly.

In some embodiments, the positioning ring may be slidably connected to the positioning cylinder 1. That is, the positioning ring may slide up and down along the outer wall of the positioning cylinder 1. It should be understood that the short rod rotationally connected to the positioning ring may also slide up and down relative to the outer wall of the positioning cylinder 1.

In some embodiments, the positioning ring may be slidably connected to the positioning cylinder 1 in various ways. For example, a groove structure may be provided on the outer wall of the positioning cylinder 1, and the positioning ring may be slidably connected to the positioning cylinder 1 under a condition that the positioning ring is stuck in the groove structure through a snap-in structure (e.g., a snap block). As another example, a sliding rod may be fixedly connected to the outer wall of the positioning cylinder 1, and the positioning ring may be sleeved on the sliding rod, which may realize a sliding connection with the positioning cylinder 1.

In some embodiments, an end of the spring may be fixedly connected to the outer wall of the positioning cylinder 1, and another end of the spring may be rotationally connected to the short rod. Merely by way of example, the end of the spring may be in a detachable connection with the outer wall of the positioning cylinder 1 to facilitate the installation and detachable of the spring and improve installation flexibility.

It should be understood that the spring connected to the short rod may adjust a spread-out angle of the mesh rod. However, due to different elasticity coefficients of springs, the springs have different pulling forces on the mesh rod, thus, the springs with different elasticity coefficients may make the mesh rod have different spread-out angles in a natural state. Accordingly, depending on usage scenarios (e.g., a size of the installation hole), the spring with an appropriate elasticity coefficient may be selected to make the mesh rod have an appropriate spread-out angle (e.g., spread out at a small angle) in the natural state, which may in turn make the device for preventing frost heaving and thawing settlement easier to be installed.

In some embodiments, due to the pulling force of the spring, the mesh rod may have a small spread-out angle in the natural state. When the thawing settlement or the frost heaving occurs, the greater the thawing settlement displacement or the frost heaving displacement, the greater the spread-out angle of the mesh rod, thus realizing the effect of preventing frost heaving and thawing settlement. At the same time, the larger the spread-out angle of the mesh rod, the larger the elongation of the spring, i.e., the larger the resilience force of the spring, thereby further inhibiting the thawing settlement or the frost heaving of the structure. The spread-out angle of the mesh rod may be understood as an angle between an inner side surface of the mesh rod and the outer wall of the positioning cylinder 1.

It should be noted that an actual action of the reinforcing structure (preventing frost heaving and thawing settlement) may be related to an arrangement manner of the mesh rod. When the mesh rod is provided upwards, the reinforcing structure may be configured to prevent the frost heaving; when the mesh rod is provided downwards, the reinforcing structure may be configured to prevent the thawing settlement.

In some embodiments of the present disclosure, the effect of the device for preventing frost heaving and thawing settlement to inhibit the frost heaving and the thawing settlement may be further enhanced by providing the reinforcing structure and increasing the contact area with the frozen soil using the mesh rod.

In some embodiments, the device for preventing frost heaving and thawing settlement may further include a temperature sensor (not shown in the figures), a temperature control unit (not shown in the figures), and a processor (not shown in the figures). The temperature sensor and the temperature control unit may be provided at least on the anti-thawing settlement rod 3 and the anti-frost heaving rod 4. The processor may be configured to obtain a current temperature of the frozen soil from the temperature sensor. The processor may be further configured to determine compensating thermal power based on the current temperature of the frozen soil. The processor may be further configured to generate a control instruction based on the compensating thermal power and send the control instruction to the temperature control unit to control the temperature control unit to operate with the compensating thermal power.

The temperature sensor refers to a sensing device configured to obtain temperature information. In some embodiments, the temperature sensor may be configured to obtain the current temperature of the frozen soil and transmit the current temperature of the frozen soil to the processor.

In some embodiments, one or more temperature sensors may be provided, and a plurality of temperature sensors may be provided on a plurality of anti-thawing settlement rods 3 or a plurality of anti-frost heaving rods 4, respectively.

The temperature control unit refers to a component or device configured to monitor and control a temperature. In some embodiments, the temperature control unit may receive the control instruction sent by the processor and operate based on the control instruction. For example, the temperature control unit may receive a compensating thermal power instruction sent by the processor and operate with the compensating thermal power.

In some embodiments, one or more temperature control units may be provided, and a plurality of temperature control units may be provided on the plurality of anti-thawing settlement rods 3 or the plurality of anti-frost heaving rods 4, respectively.

In some embodiments, the processor may process data or information related to temperature control of the device for preventing frost heaving and thawing settlement to perform functions described in the embodiments. For example, the processor may receive, analyze, and process information or data sent by the temperature sensor.

In some embodiments, the processor may include one or more sub-processing devices (e.g., a single-core processing device or a multi-core processing device). Merely by way of example, the processor may include a central processing unit (CPU), an application-specific integrated circuit (ASIC), a controller, a microcontroller unit, or the like, or any combination thereof.

In some embodiments, the processor may also include a register configured to store data obtained, transmitted, or processed by the processor. For example, the processor may store one or more temperature data obtained from the temperature sensor in the register.

It should be noted that signal transmission between the temperature sensor, the temperature control unit, and the processor may be realized in various ways. For example, the signal transmission may be realized in a wired transmission manner (e.g., Ethernet, cable, etc.), a wireless transmission manner (e.g., Bluetooth, WiFi, etc.), or any other feasible transmission manner.

In some embodiments, the processor may be configured to perform the following operations.

S1: a current temperature of the frozen soil may be obtained from the temperature sensor.

The current temperature of the frozen soil refers to a temperature of the frozen soil collected most recently by the temperature sensor. In some embodiments, the current temperature of the frozen soil may reflect a current temperature condition of the frozen soil surrounding the device for preventing frost heaving and thawing settlement.

In some embodiments, the temperature sensor provided on the anti-thawing settlement rod 3 or the anti-frost heaving rod may obtain the current temperature of the frozen soil in real time and transmit the current temperature of the frozen soil to the processor.

In some embodiments, the current temperature of the frozen soil may also be obtained in any other feasible manner. For example, the current temperature of the frozen soil may also be obtained based on manual input, or the like.

S2: a compensating thermal power may be determined based on the current temperature of the frozen soil.

The compensating thermal power refers to an output power of the temperature control unit determined to compensate for a change in temperature. In some embodiments, the compensating thermal power may include exothermic power and cooling power.

In some embodiments, based on the current temperature of the frozen soil, the processor may determine the compensating thermal power in various ways. For example, based on the current temperature of the frozen soil, the processor may determine the compensating thermal power through a preset comparison table. The preset comparison table may be constructed based on historical data, experimental simulation, etc.

More descriptions regarding determining the compensating thermal power may be found in the descriptions hereinafter.

S3: a control instruction may be generated based on the compensating thermal power and the control instruction may be sent to the temperature control unit to control the temperature control unit to operate with the compensating thermal power.

The control instruction refers to an instruction used to control the temperature control unit to work. For example, the control instruction may include an instruction to operate with the compensating thermal power, a start-stop instruction, etc.

In some embodiments, the processor may automatically generate the control instruction based on the compensating thermal power and send the control instruction to the temperature control unit, and the temperature control unit may execute the control instruction when the temperature control unit receives the control instruction. For example, the temperature control unit may operate with the exothermic power or the cooling power.

It should be understood that when the current temperature of the frozen soil is low, the temperature control unit may raise the temperature around the installation hole to relieve the phenomenon of frost heaving by continuous exothermic heating. When the current temperature of the frozen soil is high, the temperature control unit may reduce the temperature around the installation hole to relieve the phenomenon of thawing settlement by continuous cooling.

In some embodiments of the present disclosure, by arranging the temperature sensor, the temperature control unit, and the processor, the processor may determine the compensating thermal power based on the current temperature of the frozen soil and control the temperature control unit to operate with the compensating thermal power, thereby effectively preventing and controlling the frost heaving or thawing settlement disaster.

In some embodiments, the processor may be configured to store one or more temperature data (e.g., the current temperature of the frozen soil) collected by the temperature sensor in the register inside the processor or another external storage. In some embodiments, the processor may be further configured to determine the compensating thermal power based on a temperature sequence of the frozen soil in a preset time period.

The temperature sequence of the frozen soil refers to a collection of a plurality of frozen soil temperature data collected by the temperature sensor over the preset time period. In some embodiments, the temperature sequence of the frozen soil may at least include the current temperature of the frozen soil.

In some embodiments, based on the temperature sequence of the frozen soil in the preset time period, the processor may determine the compensating thermal power using a compensating thermal power determination model. Merely by way of example, the compensating thermal power determination model may determine the compensating thermal power by processing the temperature sequence of the frozen soil in the preset time period.

In some embodiments, the device for preventing frost heaving and thawing settlement may further include one or more first displacement sensors. Each of the first displacement sensors may be provided at a first peripheral preset point. In some embodiments, the one or more first displacement sensors may be configured to measure diastolic displacements of one or more mesh rods. The diastolic displacement of the mesh rod(s) may reflect the spread-out angle of the mesh rod(s).

In some embodiments, when each of the first displacement sensors is provided at the first peripheral preset point, the first displacement sensor may represent the diastolic displacement of the mesh rod by measuring a displacement of the first peripheral preset point.

In some embodiments, the device for preventing frost heaving and thawing settlement may include one or more temperature sensors. Each of the one or more temperature sensors may be provided at a second peripheral preset point.

The first peripheral preset point refers to a position point configured to arrange the first displacement sensor. The second peripheral preset point refers to a position point configured to arrange the temperature sensor. It should be noted that the first peripheral preset point and the second peripheral preset point may only be described for ease of description to show a difference, and the first peripheral preset point and the second peripheral preset point may be substantially the same.

In some embodiments, the first peripheral preset point and the second peripheral preset point may be at least located in at least one region of a bottom, a middle, or a top of the mesh rod. For example, when a plurality of mesh rods are provided, the first displacement sensors and the temperature sensors may be provided in the middle of the plurality of mesh rods at intervals. In this case, the first peripheral preset point and the second peripheral preset point may be located at the middle of the mesh rod(s). As another example, the first displacement sensors and the temperature sensors may be provided in the middle and the top of the mesh rod, respectively. In this case, the first peripheral preset point may be located at the middle of the mesh rod, and the second peripheral preset point may be located at the top of the mesh rod.

In some embodiments, the first peripheral preset point and the second peripheral preset point may also be located at any other feasible position. For example, the first peripheral preset point and the second peripheral preset point may also be located at at least one region of the bottom, the middle, or the top of the anti-thawing settlement rod 3 or the anti-frost heaving rod 4, etc.

Descriptions regarding a way of providing the first peripheral preset point and the second peripheral preset point may be found in related descriptions hereinafter.

In some embodiments, the processor may be further configured to determine temperature sequences of the frozen soil of one or more second peripheral preset points in the preset time period based on the temperature data collected by one or more temperature sensors; determine displacement sequences of the one or more second peripheral preset points in the preset time period based on one or more displacement data collected by one or more first displacement sensors; and determine the compensating thermal power through the compensating thermal power determination model based on the temperature sequences of the frozen soil of the one or more second peripheral preset points and the displacement sequences of the one or more first peripheral preset points in the preset time period.

The temperature sequences of the frozen soil of the one or more second peripheral preset points refer to a collection of temperatures of the frozen soil collected by the temperature sensors at the one or more second peripheral preset points in the preset time period. In some embodiments, the temperature sequences of the frozen soil of the one or more second peripheral preset points in the preset time period may be obtained from the register inside the processor or another external storage.

The displacement sequences of the one or more first peripheral preset points refer to a collection of displacements of the one or more first peripheral preset points collected by the first displacement sensors in the preset time period. In some embodiments, the displacement sequences of the one or more first peripheral preset points in the preset time period may be obtained from the register inside the processor or another external storage.

The compensating thermal power determination model refers to a model configured to determine the compensating thermal power. In some embodiments, the compensating thermal power determination model may be a machine learning model. For example, the compensating thermal power determination model may include a recurrent neural network (RNN) model, a deep neural network (DNN) model, or a combination of one or more of other customized models, etc.

In some embodiments, the compensating thermal power determination model may include a temperature embedding layer, a displacement embedding layer, and a thermal power recommending layer.

The temperature embedding layer may be configured to determine temperature embedding vectors by processing the temperature sequences of the frozen soil of the one or more second peripheral preset points in the preset time period. In some embodiments, the temperature embedding layer may be a machine learning model. For example, the temperature embedding layer may include a convolutional neural networks (CNN) model, etc.

In some embodiments, an input of the temperature embedding layer may include the temperature sequences of the frozen soil of the one or more second peripheral preset points in the preset time period, and an output of the temperature embedding layer may include the temperature embedding vectors.

The displacement embedding layer may be configured to determine displacement embedding vectors by processing the displacement sequences of the one or more first peripheral preset points in the preset time period. In some embodiments, the displacement embedding layer may be a machine learning model. For example, the displacement embedding layer may include a CNN model, etc.

In some embodiments, an input of the displacement embedding layer may include the displacement sequences of the one or more first peripheral preset points in the preset time period, and an output of the displacement embedding layer may include the displacement embedding vectors.

The thermal power recommending layer may be configured to determine the compensating thermal power by processing the temperature embedding vectors and the displacement embedding vectors. In some embodiments, the thermal power recommending layer may be a machine learning model. For example, the thermal power recommending layer may include a DNN model, etc.

In some embodiments, an input of the thermal power recommending layer may include the temperature embedding vectors and the displacement embedding vectors, and an output of the thermal power recommending layer may include the compensating thermal power.

In some embodiments, the compensating thermal power determination model may be obtained by a jointly training of the temperature embedding layer, the displacement embedding layer, and the thermal power recommending layer.

In some embodiments, the processor may train an initial temperature embedding layer, an initial displacement embedding layer, and an initial thermal power recommending layer based on a plurality of labeled training samples. The training samples may include the temperature sequences of the frozen soil of the one or more second peripheral preset points and the displacement sequences of the first peripheral preset points in a sample preset time period, and labels may include compensating thermal power corresponding to the training samples. The training samples may be determined based on historical data, and the labels may be determined based on manual labeling, etc.

An exemplary training process may include obtaining the temperature embedding vectors output by the initial temperature embedding layer by inputting the temperature sequences of the frozen soil of the one or more second peripheral preset points in the sample preset time period into the initial temperature embedding layer; obtaining the displacement embedding vectors output by the initial displacement embedding layer by inputting the displacement sequences of the one or more first peripheral preset points in the sample preset time period into the initial displacement embedding layer; obtaining the compensating thermal power output by the initial thermal power recommending layer by inputting the temperature embedding vectors output by the initial temperature embedding layer and the displacement embedding vectors output by the initial displacement embedding layer into the initial thermal power recommending layer; and constructing a loss function based on the labels and the compensating thermal power output by the initial thermal power recommending layer, and synchronously updating parameters of the initial temperature embedding layer, the initial displacement embedding layer, and the initial thermal power recommending layer. A trained temperature embedding layer, a trained displacement embedding layer, and a trained thermal power recommending layer may be obtained through parameter updating.

In some embodiments of the present disclosure, the temperature sequences of the frozen soil of the one or more second peripheral preset points and the displacement sequences of the first peripheral preset points in the preset time period may be processed based on the trained compensating thermal power determination model to determine the compensating thermal power, thereby effectively ensuring the accuracy of the compensating thermal power. By training the compensating thermal power determination model through the joint training, not only a count of samples required for training may be reduced, but also the training efficiency may be improved. In addition, on the basis of considering the current temperature of the frozen soil, the temperature sequences of the frozen soil of the one or more second peripheral preset points in the preset time period may be further considered, so that a rapid change in the temperature of the frozen soil may be fed back in time, which allows for better thermal compensation.

In some embodiments, the device for preventing frost heaving and thawing settlement may further include one or more second displacement sensors. Each of the one or more second displacement sensors may be provided at a second peripheral preset point for measuring a displacement of the second peripheral preset point.

In some embodiments, the input of the temperature embedding layer may also include the temperature sequences of the frozen soil of the one or more second peripheral preset points in the preset time period and the displacements of the corresponding second peripheral preset points when each temperature of the frozen soil is collected, which may be represented by a vector, such as a vector (($T_1$, $S_1$), ($T_2$, $S_2$), ..., ($T_n$, $S_n$)). Tn denotes a temperature of the frozen soil of an n-th second peripheral preset point collected at a certain time in the preset time period, and $S_n$ denotes a displacement of the corresponding second peripheral preset point when $T_n$ is collected.

In some embodiments, the training samples may further include the temperature sequences of the frozen soil of the one or more second peripheral preset points and the displacement of the corresponding second peripheral preset point at the time of collecting each temperature of the frozen soil in the sample preset time period.

In some embodiments of the present disclosure, by using the temperature of the frozen soil of each second peripheral preset point and the displacement collected at the point as the input of the compensating thermal power determination model, accurate temperature information of a peripheral space may be obtained, which may more accurately reflect the influence of an external environment, thereby improving the prediction accuracy of the compensating thermal power determination model.

In some embodiments, when the displacement sensors and the temperature sensors are respectively arranged based on the first peripheral preset points and the second peripheral preset points, the first peripheral preset points and the second peripheral preset point may be determined based on a preferred arrangement interval. In some embodiments, the preferred arrangement interval may be determined based on a temperature distribution of the frozen soil layer at an installation position of the device for preventing frost heaving and thawing settlement.

The temperature distribution of the frozen soil layer may reflect a temperature change in the frozen soil layer. In some embodiments, the temperature distribution of the frozen soil layer may be obtained by field measurement.

The preferred arrangement interval refers to a preferred interval value or an interval range when the first peripheral preset points or the second peripheral preset points are arranged.

It should be understood that the more uniform the temperature distribution of the frozen soil layer, the larger the preferred arrangement interval; the more dispersed the temperature distribution of the frozen soil layer, the smaller the preferred arrangement interval.

For example, if the temperature distribution of the frozen soil layer is relatively uniform, i.e., there is almost no large temperature difference between similar frozen soil regions, a distance between any two peripheral preset points of the first peripheral preset points may be larger to avoid that temperature data collected by two adjacent first displacement sensors is close, thereby causing a waste of resources. Similarly, a distance between any two peripheral preset points of the second peripheral preset points may be larger to avoid that the temperature data collected by the two adjacent temperature sensors is close, thereby causing a waste of resources.

As another example, if the temperature distribution of the frozen soil layer is relatively dispersed, i.e., there may be a large temperature difference between the similar frozen soil regions, different temperatures of different frozen soil regions may lead to different degrees of thermal expansion and contraction of structures (e.g., the mesh rod) in different regions, resulting in disproportionate displacements of different positions of the structures when the structures (e.g., the mesh rod) are spread out. Therefore, more first displacement sensors may be provided. That is, the distance between any two peripheral preset points of the first peripheral preset points may be smaller. Similarly, in order to avoid incomplete collection of the temperature data that makes prediction results inaccurate, more temperature sensors may be provided. That is, the distance between any two peripheral preset points of the second peripheral preset point may be smaller.

In some embodiments, the processor may determine the preferred arrangement interval in various ways. For example, the preferred arrangement interval may be determined based on historical data. As another example, the machine learning model may determine the preferred arrangement interval by processing the temperature distribution of the frozen soil layer.

In some embodiments of the present disclosure, the first peripheral preset points and the second peripheral preset points may be arranged based on the preferred arrangement interval. On the one hand, data collection may be reduced to a certain extent to avoid a waste of resources, and on the other hand, the effectiveness and integrity of the data collection may be guaranteed, thereby effectively ensuring the accuracy of the collected data.

Beneficial effects brought by the embodiments of the present disclosure may include but are not limited to the following illustrations: (1) the device for preventing frost heaving and thawing settlement has effects of preventing frost heaving and thawing settlement. The lower portion of the device is provided with the plurality of anti-frost heaving rods to effectively prevent and control the frost heaving disaster, and the upper portion of the device is provided with the plurality of anti-thawing settlement rods to effectively prevent and control the thawing settlement disaster, so that the device is a multi-functional protection structure for freezing disaster. In addition, the device for preventing frost heaving and thawing settlement is multi-functional and capable of comprehensively and effectively guaranteeing safe operation of buildings (structures) in the permafrost frozen soil region or the seasonal frozen soil region, which is easy to be promoted and applied; (2) the device for preventing frost heaving and thawing settlement has a high degree of versatility. As a lower base, the support structure can be connected to a plurality of structures on the support structure, such as a pipeline, a transmission tower base, a ground temperature monitoring hole, a transmission tower pole, etc. The device can be configured to prevent and control frosting and thawing disasters of a plurality of buildings (structures) to ensure safe and stable operation, thereby having a wide range of application scenarios; (3) the device for preventing frost heaving and thawing settlement is in a form of small structure, which is easy to be assembled, and facilitates installation and laying. In addition, there is no need to perform excavation of the frozen soil for the device for preventing frost heaving and thawing settlement when the device is installed, and the anti-frost heaving rod and the anti-thawing settlement rod of the structure are spread out when the installation is completed or when frosting and thawing occurs, which saves space and effectively protects the ecosystem of frozen soils and wetlands; (4) by installing the reinforcing structure, the effect of the device for preventing frost heaving and thawing settlement in inhibiting frost heaving and thawing settlement can be further enhanced; (5) by providing the temperature sensor, the temperature control unit, and the processor, the processor determines the compensating thermal power based on the current temperature of the frozen soil and further controls the temperature control unit to operate with the compensating thermal power, the frost heaving or thawing settlement disaster may be further effectively prevented and controlled; (6) the diastolic displacement of the mesh rod can be obtained by arranging the displacement sensor, and the compensating thermal power can be determined by processing the temperature sequences of the frozen soil of the one or more second peripheral preset points and the displacement sequences of the first peripheral preset points in the preset time period based on the trained compensating thermal power determination model, thereby effectively ensuring the accuracy of the compensating thermal power. Furthermore, the compensating thermal power determination model can be trained by the joint training, which not only reduces the count of samples required for training, but also improves the training efficiency; (7) the first peripheral preset points and the second peripheral preset points are arranged based on the preferred arrangement interval, on the one hand, the data collection can be reduced to a certain extent, thereby avoiding a waste of resources, and on the other hand, the effectiveness and integrity of the data collection can be guaranteed, thereby effectively ensuring the accuracy of the collected data.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements, and amendments to the present disclosure. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or feature described in connection with the embodiment is included in at least one embodiment of the present disclosure. Therefore, it is emphasized and should be appreciated that two or more references to "an embodiment" or "one embodiment" or "an alternative embodiment" in various portions of the present disclosure are not necessarily all referring to the same embodiment. In addition, some features, structures, or characteristics of one or more embodiments in the present disclosure may be properly combined.

Furthermore, the recited order of processing elements or sequences, or the use of numbers, letters, or other designations therefore, is not intended to limit the claimed processes and methods to any order except as may be specified in the claims. Although the above disclosure discusses some embodiments of the invention currently considered useful by various examples, it should be understood that such details are for illustrative purposes only, and the additional claims are not limited to the disclosed embodiments. Instead, the claims are intended to cover all combinations of corrections and equivalents consistent with the substance and scope of the embodiments of the invention. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that object of the present disclosure requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes. History application documents that are inconsistent or conflictive with the contents of the present disclosure are excluded, as well as documents (currently or subsequently appended to the present specification) limiting the broadest scope of the claims of the present disclosure. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A device for preventing frost heaving and thawing settlement, comprising: a positioning cylinder, an upper cover, an anti-thawing settlement rod configured to prevent the thawing settlement, and an anti-frost heaving rod configured to prevent the frost heaving, wherein the upper cover is sealingly assembled on a top of the positioning cylinder, and the upper cover is provided with a fixing position configured to install a structure;

a bottom of the positioning cylinder is provided with the anti-frost heaving rod, and an upper portion of the positioning cylinder is provided with the anti-thawing settlement rod;

the anti-frost heaving rod is provided upwards, a bottom of the anti-frost heaving rod is rotatably provided on a mounting base of the anti-frost heaving rod through a first connecting screw rod, the anti-thawing settlement rod is provided downwards, a top of the anti-thawing settlement rod is rotatably provided on a mounting base of the anti-thawing settlement rod through a second connecting screw rod, and the first connecting screw rod and the second connecting screw rod are provided with a return spring, respectively; and the anti-thawing settlement rod is connected to a lower portion of the positioning cylinder through a trigger mechanism, the trigger mechanism includes a rotating hook and a trigger rod, the rotating hook is matched with a positioning hook arranged at an end of the anti-thawing settlement rod to position the anti-thawing settlement rod, a bottom of the trigger rod penetrates out of the bottom of the positioning cylinder, the trigger rod is in contact with the rotating hook to drive the rotating hook to rotate when the trigger rod moves upwards, and the positioning hook is separated from the rotating hook when the trigger rod is rotated.

2. The device of claim 1, wherein the upper cover is connected to the top of the positioning cylinder through threads.

3. The device of claim 1, wherein a positioning bracket is fixed on a side wall of the positioning cylinder, and a middle of the rotating hook is rotationally connected to the positioning bracket.

4. The device of claim 3, wherein an end of the rotating hook is provided with a hook matching the positioning hook, a tension spring is fixed at the end of the rotating hook, and another end of the tension spring is fixed to the positioning bracket.

5. The device of claim 1, wherein a limiting mechanism is provided on a side wall of the positioning cylinder to limit a position of the trigger rod, the limiting mechanism includes a vertically and fixedly provided limiting block, one or more pre-tightening members in a horizontal arrangement are provided in the limiting block, each of the one or more pre-tightening members includes a compression spring and a positioning ball fixed at an end of the compression spring, and the trigger rod is provided with a positioning groove matching the positioning ball.

6. The device of claim 1, wherein a plurality of anti-thawing settlement rods are provided uniformly and circumferentially on an outer wall of the positioning cylinder, and a plurality of anti-frost heaving rods are provided uniformly and circumferentially on the outer wall of the positioning cylinder.

7. The device of claim 1, wherein the plurality of anti-thawing settlement rods and the plurality of anti-frost heaving rods are provided in an upper and lower interval arrangement.

8. The device of claim 1, wherein
a first limiting baffle is fixed to a side surface of the mounting base of the anti-frost heaving rod to limit a rotating angle of the anti-frost heaving rod when the anti-frost heaving rod is spread out; and
a second limiting baffle is fixed to a side surface of the mounting base of the anti-thawing settlement rod to limit a rotating angle of the anti-thawing settlement rod when the anti-thawing settlement rod is spread out.

9. The device of claim 1, wherein
a first side baffle is fixed to a left side surface of the anti-frost heaving rod or the anti-thawing settlement rod; and
a second side baffle is fixed to a right side surface of the anti-frost heaving rod or the anti-thawing settlement rod.

10. The device of claim 1, wherein
a top of the anti-frost heaving rod is an inclined plane;
the top of the anti-thawing settlement rod is an inclined plane;
a first angle between a top surface and an inner side surface of the anti-frost heaving rod is an obtuse angle;
a second angle between a top surface and an inner side surface of the anti-thawing settlement rod is an obtuse angle;
a third angle between the top surface and an outer side surface of the anti-frost heaving rod is an acute angle; and
a fourth angle between the top surface and an outer side surface of the anti-thawing settlement rod is an acute angle.

\* \* \* \* \*